FIG-3-

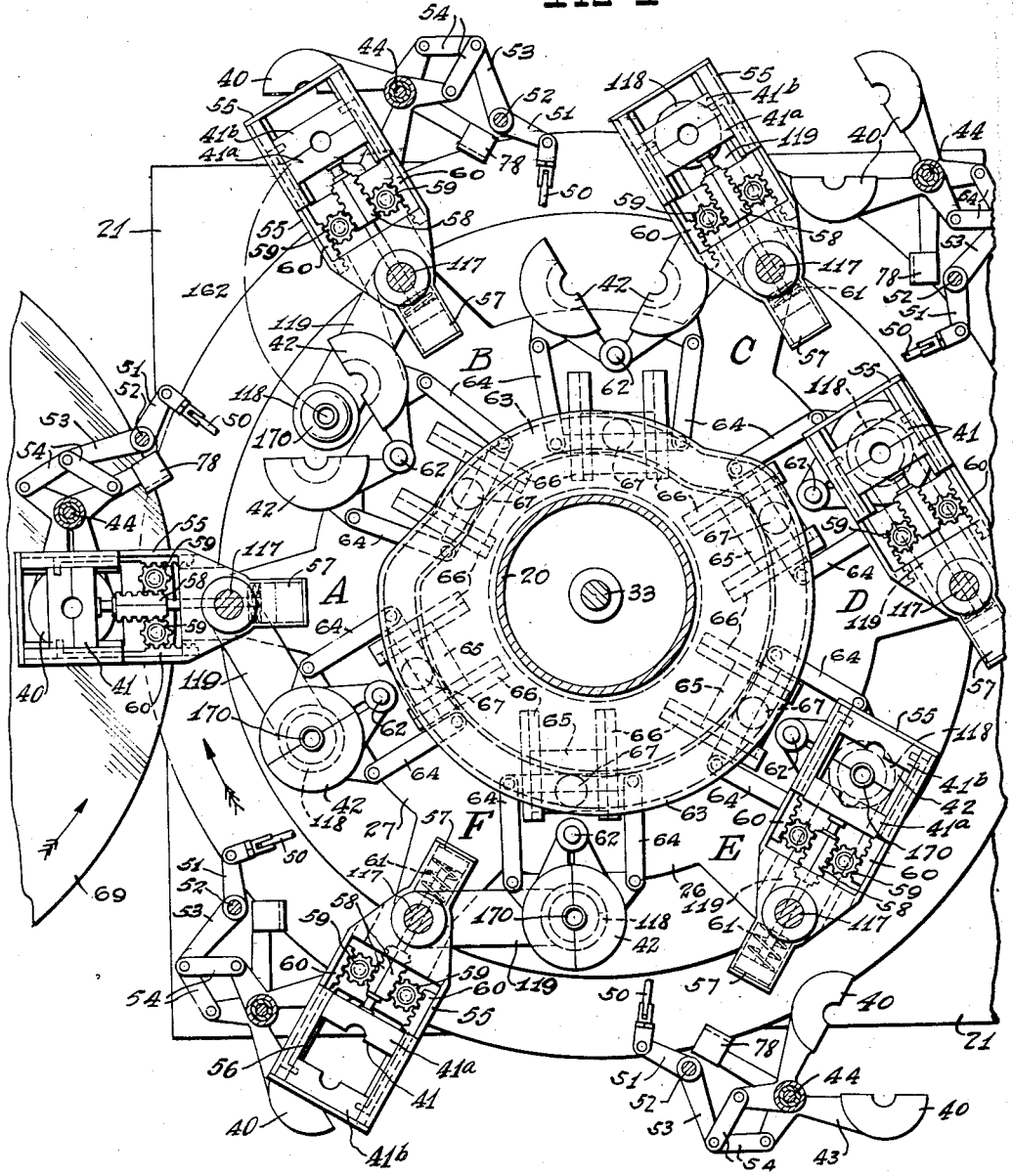

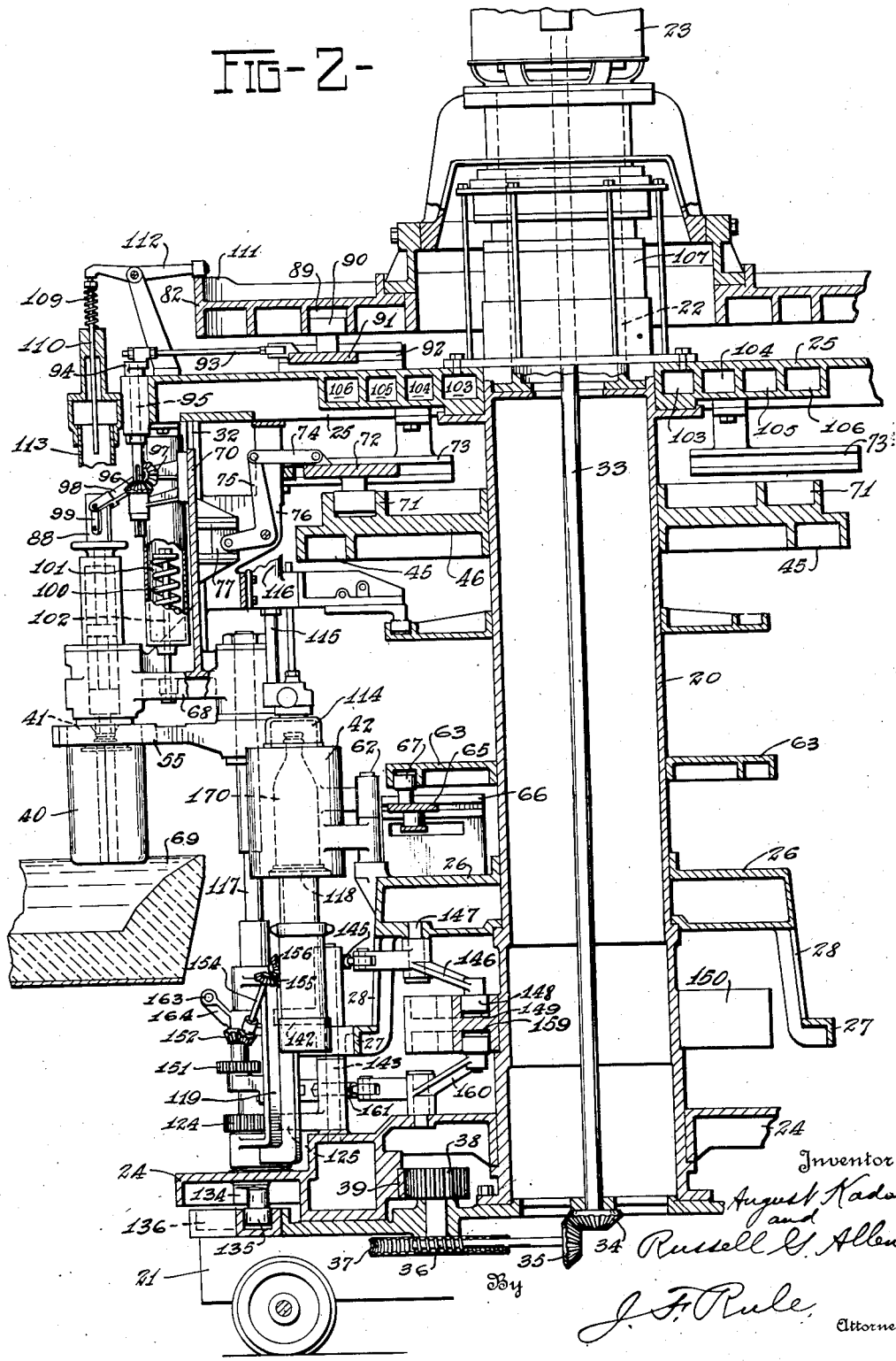

Sept. 27, 1932.   A. KADOW ET AL   1,879,689
MACHINE FOR FORMING HOLLOW GLASS ARTICLES
Filed Dec. 24, 1928   6 Sheets-Sheet 4
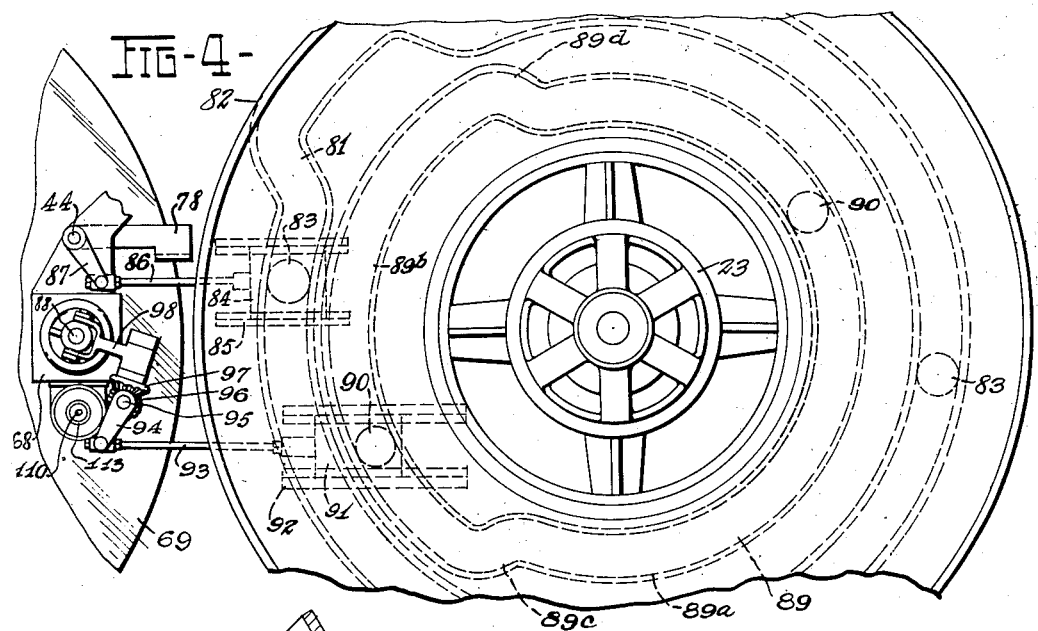

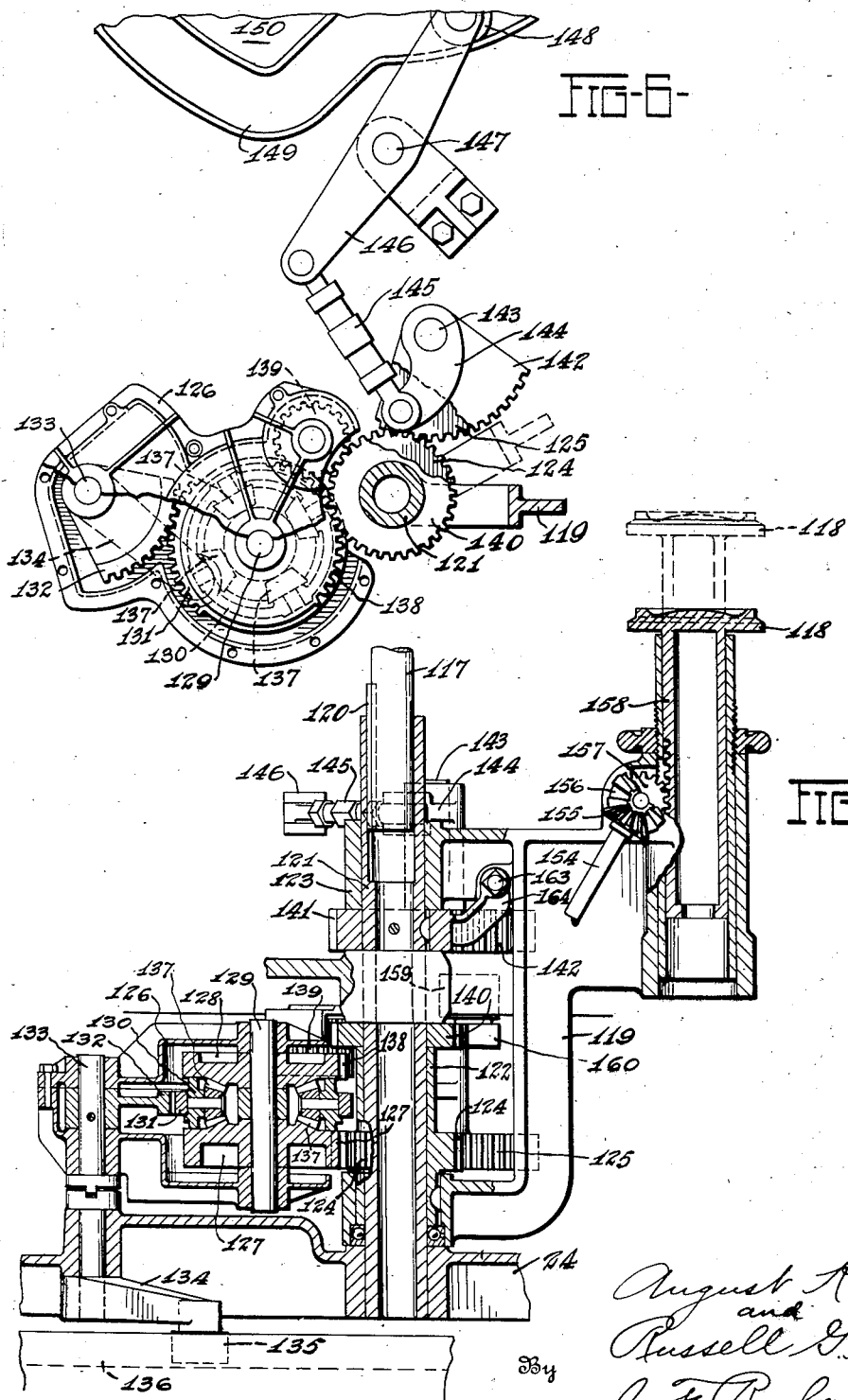

Sept. 27, 1932.  A. KADOW ET AL  1,879,689
MACHINE FOR FORMING HOLLOW GLASS ARTICLES
Filed Dec. 24, 1928  6 Sheets-Sheet 6
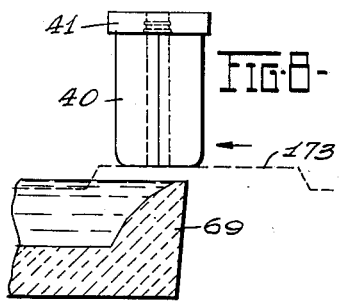
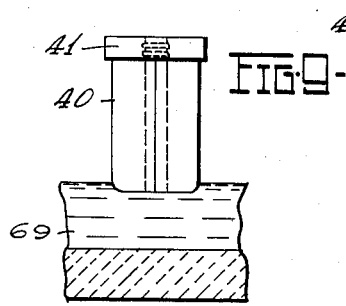
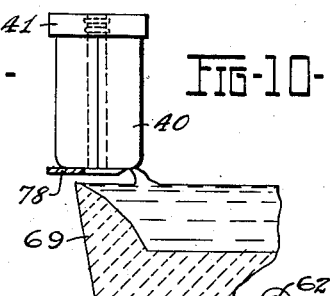
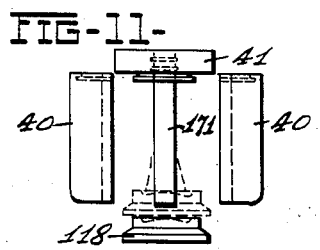
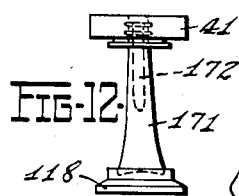
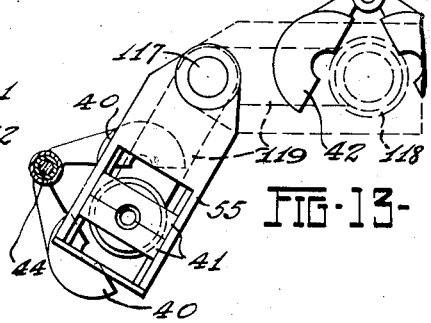
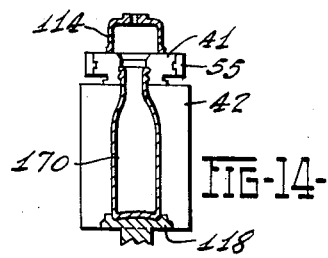
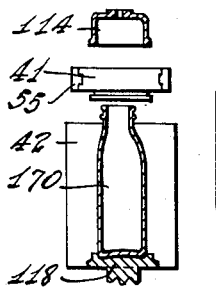
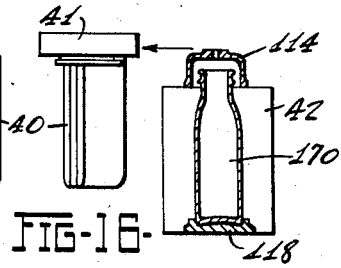
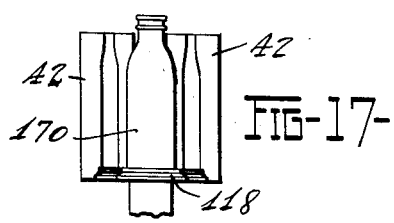
Inventors
August Kadow
and
Russell G. Allen
By J. F. Rule
Attorney Patented Sept. 27, 1932

1,879,689

UNITED STATES PATENT OFFICE

AUGUST KADOW AND RUSSELL G. ALLEN, OF TOLEDO, OHIO, ASSIGNORS TO OWENS-ILLINOIS GLASS COMPANY, OF TOLEDO, OHIO, A CORPORATION OF OHIO

MACHINE FOR FORMING HOLLOW GLASS ARTICLES

Application filed December 24, 1928. Serial No. 328,118.

The present invention relates to machines for blowing bottles, jars and other hollow glass articles. The machine as herein shown and described is of the suction gathering type in which a series of blank molds are carried on a continuously rotating mold carriage and brought in succession over a tank or pool of molten glass and gather the charges of glass by suction. Various features of the invention, however, may be embodied in other forms and types of machines.

In the well known Owens type suction gathering machine, the blank or parison molds are brought in succession over a revolving pot or tank of molten glass, dip into contact with the glass and gather by suction while the finishing molds pass beneath the tank and are then lifted to the plane of the blank molds and enclose the parisons after the blank molds have opened, the up and down movements of the finishing molds being controlled by a stationary serpentine track.

An object of our invention is to provide a practical form of machine in which the finishing molds are maintained at all times at the same level and in a fixed position relative to the rotating mold carriage, except for their opening and closing movements. The use of the stationary serpentine track for controlling the position of the finishing molds is thereby rendered unnecessary, the usual vibration incident to the use of such cam track is avoided, and better sealing conditions between the blank mold, neck mold and finishing mold are obtained.

A further object of the invention is to provide a suction type of machine having a compact arrangement of parts, in which up and down movements of the finishing molds are unnecessary, and only a small vertical movement of the blank and neck molds is required.

A further object of the invention is to provide a new and practical form of machine in which the parisons of glass may be developed to a certain extent in the open, that is, after the blank molds have opened and before the finishing molds have enclosed the parisons. In carrying out this object of the invention, we have provided a construction in which each neck mold and the corresponding mold bottom are mounted on separate arms arranged to swing about the same vertical axis on the mold carriage, suitable mechanism being provided for swinging the mold bottom arm to bring the mold bottom beneath the bare blank, for moving the mold bottom upward into supporting engagement with the lower end of the bare blank, for swinging the neck mold and mold bottom as a unit to transfer the parison from the blank mold to the finishing mold, for blowing the blank in the open, and for imparting vertical movement to the mold bottom during the transfer.

Various other objects of the invention and numerous novel features of construction and operation will appear hereinafter.

Referring to the accompanying drawings:

Fig. 1 is a sectional plan view of the blowing machine and a portion of the gathering tank, and illustrates particularly the relative arrangement of the molds and their various horizontal movements.

Fig. 2 is a sectional elevation of the machine showing a mold in dip, parts of the machine being broken away.

Fig. 3 is a front elevation showing one of the sections of the machine including a mold group and operating mechanism therefor.

Fig. 4 is a plan view showing the knife and plunger and their operating cams.

Fig. 5 is a fragmentary sectional plan view showing particularly the dip head mechanism, the mechanism for opening and closing the blank molds, and the cams for operating said mechanisms.

Fig. 6 is a fragmentary plan view showing gearing for rocking the neck mold arm and the mold bottom arm either separately or together.

Fig. 7 is a sectional elevation showing the gear mechanism of Fig. 6, and also mechanism for lifting and lowering the mold bottom.

Figs. 8 to 17, inclusive, are diagrammatic views showing successive steps in the gathering of a charge of glass and developing it into the finished article.

Fig. 8 shows the blank mold in its elevated position moving over the rim of the gathering tank.

Fig. 9 shows said mold in dip for gathering a charge by suction.

Fig. 10 shows the mold lifted and the glass being severed.

Fig. 11 shows the blank mold opened and the mold bottom positioned beneath the bare blank and also indicates in broken lines the upward movement of the mold bottom for centering and developing the blank.

Fig. 12 shows the bare blank supported by the neck mold and mold bottom and partially blown to hollow form.

Fig. 13 illustrates the movement of the neck mold arm for transferring the blank from the blank mold to the finishing mold.

Fig. 14 shows the parison enclosed in the finishing mold and blown to its finished form.

Fig. 15 shows the blowing head and neck mold lifted.

Fig. 16 shows the neck mold moving laterally to engage the blank mold, and the blowing head moved downward into engagement with the finishing mold for the final blowing operation.

Fig. 17 shows the finishing mold open to permit removal of the finished bottle.

Figure 3:
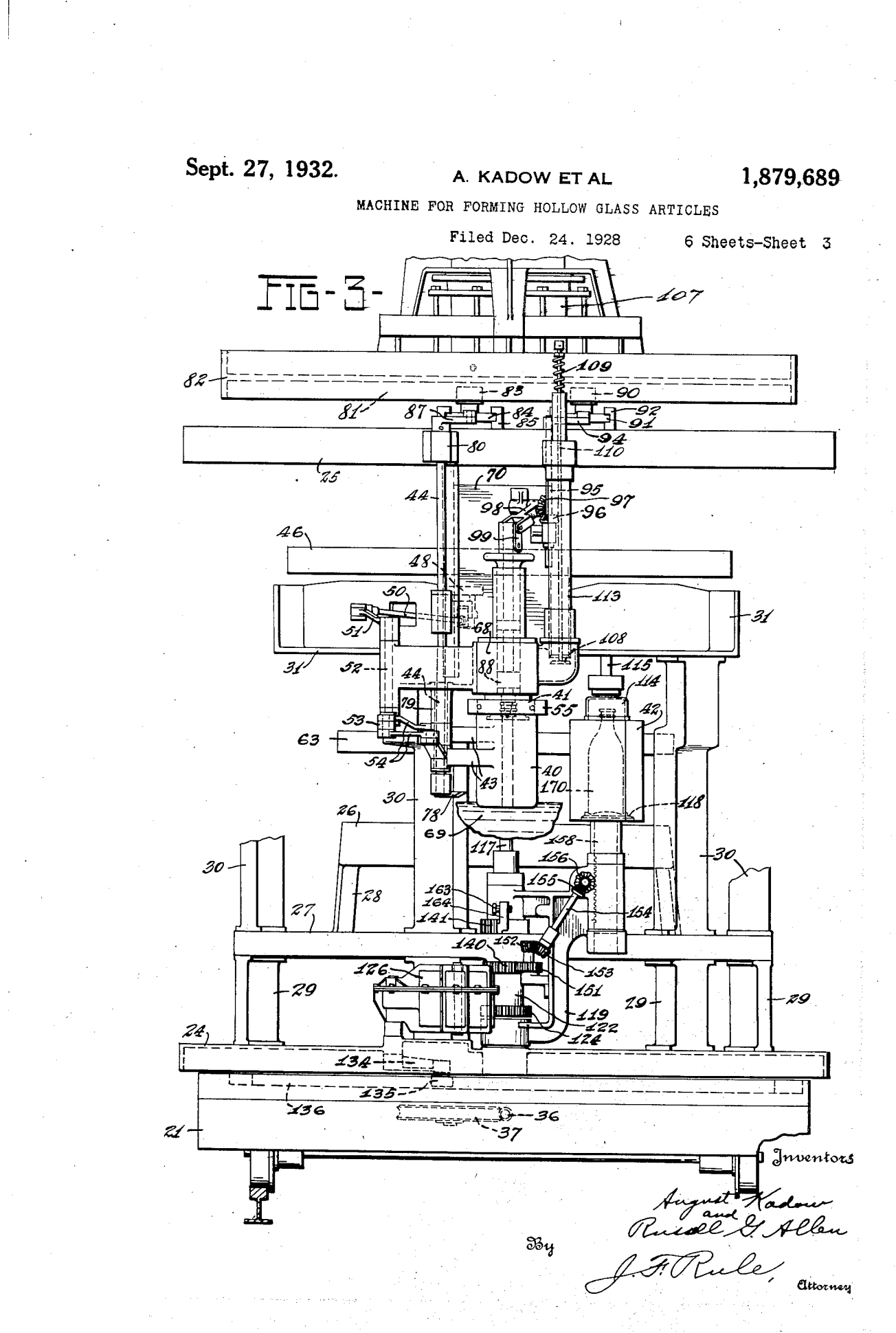

Referring to Fig. 2, the machine comprises a central stationary column 20 in the form of a hollow cylinder mounted on a wheeled base or truck 21. The column 20 includes an upper section 22 on which is mounted an electric motor 23 for driving the machine. A mold carriage mounted to rotate about the center column 20 comprises a lower section 24, an upper section 25, and intermediate sections 26 and 27 (Figs 2 and 3). The sections 26 and 27 may comprise a single casting, the two sections being united by integral arms 28. The section 27 is mounted on standards 29 rising from the section 24. An annular series of standards 30 rising from the section 27 support at their upper ends an annular series of spacing plates 31 (Figs. 3 and 5) between which plates are vertical slideways 32 for the dip heads, as will hereinafter appear.

The mold carriage is rotated continuously about the vertical axis of the center column 20. For this purpose, the shaft 33 of the motor 23 is extended vertically downward to the base of the machine and at its lower end carries a bevel gear 34 driving a gear 35 fixed on a worm shaft carrying a worm 36 which drives a worm wheel 37. Keyed to the worm wheel shaft is a gear 38 which runs in mesh with an annular gear 39 formed on the lower section 24 of the mold carriage, thereby rotating the carriage.

Mounted on the carriage to rotate therewith are groups of molds, each group comprising a blank mold 40, a neck mold 41 and a finishing mold 42. Each blank mold comprises horizontally separable sections carried on arms 43 pivotally mounted to rock about a vertical shaft 44 for opening and closing the mold. The opening and closing movements of the blank molds are controlled by a cam track 45 (Figs. 2 and 5) formed in the lower face of a stationary cam plate 46 mounted on the center column 20. As shown in Fig. 5, a cam roll 47 is mounted on a slide block 48 running in guides 49. A link 50 connects the slide block with a rock arm 51 on the upper end of a rock shaft 52 (Fig. 3). On the lower end of the rock shaft is a rock arm 53 connected to operate toggle links 54 which are operatively connected to the mold arms 43.

Each neck mold 41 comprises sections 41$^a$ and 41$^b$ (see Fig. 1) which are mounted in a neck mold arm or frame 55, said sections being bodily movable toward and from each other in guideways 56 on said arm for closing and opening the neck mold. These opening and closing movements are effected by an air motor 57 carried on the arm 55. The neck mold section 41$^a$ is directly connected to the piston rod. The section 41$^b$ is operated through connections comprising racks 58 on the piston rod, pinions 59 and racks 60, the latter connected to the section 41$^b$. The neck mold sections are moved to closed position by air pressure supplied behind the motor piston and are returned to open position by a spring 61 when the air pressure is cut off.

Each finishing mold 42 (Figs. 1 and 2) comprises partible sections pivotally mounted on a hinge pin 62 fixed to the section 26 of the mold carriage. The opening and closing movements of the finishing mold are controlled by a stationary cam plate 63. Links 64 connect the mold arms with a slide block 65 movable radially of the mold carriage in guides 66, said block carrying a cam roll 67 running in a cam groove formed in the lower face of the plate 63. It will be noted that the meeting faces of the mold sections are in a vertical plane approximately radial to the mold carriage.

The blank mold 40 and the neck mold frame 55 are supported by a dip head 68 and move up and down vertically therewith to permit the blank mold to pass over the rim of the gathering pot or tank 69 and dip for gathering a charge of glass. Rising from the dip head frame is an integral plate 70 (see Figs. 2, 3 and 5) supported in the guideways 32 for guiding the dip head in its up and down movements. These movements are controlled by a cam track 71 formed in the upper face of the cam plate 46. A slide block 72 is mounted for movement substantially radially of the mold carriage in guides 73, said slide block carrying a roll running in the cam groove 71. A link 74 connects the slide block with a bell crank lever 75 pivotally suported on a bracket 76. The lever 75 is connected through a slide block 77 to the dip head frame for lifting and lowering the latter.

A knife 78 (Figs. 1 and 3) is attached to the lower end of the rock shaft 44 which forms a pivot for the blank mold arms. The shaft 44 is mounted to rock in a bearing 79 on the dip head frame and a bearing 80 attached to the frame member 25. The rocking movements of the knife shaft are controlled by a cam 81 (see Figs. 3 and 4) on the lower face of a stationary cam plate 82. A cam roll 83 running on the cam 81 is carried on a slide block 84 which reciprocates in guides 85. A link 86 connects the slide block with a rock arm 87 fixed to the upper end of the knife shaft 44.

A plunger 88 is supported on the dip head frame and is provided at its lower end with the usual tip or neck pin which is movable downward into the neck mold cavity for forming an initial blow opening in the glass when the latter is drawn into the mold. The up and down movements of the plunger relative to the dip head frame are controlled by a cam 89 (Figs. 2 and 4) on the under face of the cam plate 82. A cam roll 90 running on the cam 89 is carried by a slide block 91 which reciprocates in guides 92, said slide block being connected through a link 93 to a rock arm 94 keyed to a rock shaft 95 mounted to rock in a bearing attached to the section 25 of the mold carriage. A bevel gear 96 splined on the shaft 95 meshes with a bevel gear 97, said gears 96 and 97 being supported on the dip head frame plate 70 for up and down movement therewith. An arm 98 is keyed to the shaft of the gear 97 and connected at its outer end through links 99 with the plunger shaft. The cam 89, as shown in Fig. 4, comprises a dwell portion 89$^a$ by which the plunger is held in its inoperative or lifted position relative to the dip head, and a dwell portion 89$^b$ by which the plunger is held in its lowered or operative position. As the cam roll 90 advances with the mold carriage it is brought to the operating section 89$^c$ of the cam, hereby causing the slide block 91 to be moved outward, and through the link 93 and arm 94 rocks the shaft 95. This movement is transmitted through the bevel gears 96 and 97 to the rock arm 98 which is thereby swung downward and lowers the plunger into the neck mold. This movement takes place before the blank mold is brought to gathering position. After the charge of glass has been gathered and the mold has passed beyond the tank, the plunger is withdrawn by means of the section 89$^d$ of the cam 89 which operates to draw the cam roll 90 inward. It will be noted that as the gears 96, 97 are carried up and down with the dip head, the position of the plunger relative to the neck mold is not affected by up and down movements of the mold. Also the cam 89 controls the position of the plunger relative to the neck mold entirely independently of the up and down movements and position of the mold.

The cam 71 which controls the up and down movements of the dip head frame comprises a section 71$^a$ (Fig. 5) which operates to lift the dip head and with it the blank mold as the latter approaches the gathering tank so that the blank mold is lifted to clear the rim of the tank. The mold is then lowered to a gathering position determined by the section 71$^b$ of the cam, permitting a charge of glass to be drawn by suction into the mold. A cam section 71$^c$ then operates to lift the mold over the rim of the tank, after which the mold is again lowered to the same level as while gathering and is held at said level by the dwell portion 71$^d$ of the cam until it again approaches the tank. It will be seen that the blank mold is held at the same level throughout its entire revolution, except while being lifed over the rim of the gathering tank.

The dip head frame and parts carried thereby are counterbalanced by a coil spring 100 (Fig. 2) mounted in a case 101 attached to the section 25 of the mold carriage. A rod 102 is connected at its lower end to the dip head frame and extends upwardly through the coil spring. The spring is held under compression between the lower end of the case 101 and a washer on the upper end of said rod. The spring, therefore, exerts an upward pressure through the rod and thereby counterbalances the weight of the dip head frame and parts carried thereby. The tension of the spring can be adjusted by adjusting the effective length of the rod as by means of an adjusting nut on the lower end of the rod.

The upper section 25 of the mold carriage (see Fig. 2) is formed with a plurality of chambers or compartments 103, 104, 105 and 106. The compartment 103, for example, may contain water which is distributed to the molds for cooling them. The compartment 104 may contain air under high pressure; the compartment 105 air under low pressure; and the compartment 106 vacuum or air at sub-atmospheric pressure. A distributing head 107 serves to distribute said fluids to said compartments. This distributing head and associated mechanism may be the same as disclosed in the patent to Russell G. Allen, 1,806,731, May 26, 1931.

When a blank mold 40 is brought into contact with the glass in the gathering pot 69, suction is applied as usual for drawing the glass into the mold. This suction is controlled by a valve 108 (Fig. 3). The valve is normally held closed by a coil spring 109 (Figs. 2 and 3) mounted on the stem 110 of the valve. When the blank mold is brought to gathering position, a cam 111 operates through a lever 112 to lower the valve and thereby connect the dip head and the mold cavity with the vacuum chamber 106 through a conduit 113.

When the parison of glass has been transferred to the finishing mold 42, as hereinafter described, the parison is blown to its finished form by air pressure supplied through a blowing head 114 (Fig. 2). The blowing head is carried by a piston rod 115 of an air motor 116 which lifts and lowers the blowing head and through which air is supplied to said head. The blowing head, its motor and associated mechanism may be the same as disclosed in patent to Russell G. Allen, No. 1,832,080, November 17, 1931.

By reference to Fig. 1, it will be seen that each neck mold arm 55 has an oscillating movement about the vertical axis of its shaft 117 for swinging the parison from the blank mold to the finishing mold, as more fully described hereinafter. Each mold group comprises a mold bottom plate 118 carried on an arm or frame 119 which also oscillates about the axis of the neck mold shaft 117. The mold bottom arm 119 at times registers with the neck mold arm and swings therewith. It also swings at times independently of the neck mold arm. Moreover, during the swinging of the arm 119, the mold bottom plate is given certain vertical movements on said arm, all as hereinafter fully set forth.

The mechanism for swinging the neck mold and mold bottom arms and for raising and lowering the mold bottom will be understood by reference to Figs. 2, 3, 6 and 7 taken in connection with the following description: The neck mold shaft 117 comprises an upper section having a splined connection 120 (Fig. 7) with a lower tubular section 121. The shaft extends upward through the neck mold arm 55 (see Fig. 2) and through the dip head, the arm 55 being keyed to the shaft to rock therewith.

Journalled on the section 121 of the neck mold shaft is a tubular shaft or sleeve 122 to which is secured the arm 119 which carries the mold bottom plate 118, so that when said sleeve 122 is rotated the arm 119 moves therewith about the vertical axis of the neck mold shaft 117. The arm 119 has a bearing sleeve 123 through which the shaft section 121 extends. Formed on the sleeve 122 is a gear 124 with which meshes a gear segment 125 for oscillating the mold bottom frame in a manner to be pointed out later.

Located at one side of the neck mold shaft is a gear casing 126 which houses a differential gear mechanism comprising a lower gear 127 and an upper gear 128 both mounted to rotate on a vertical shaft 129. The gear 127 runs in mesh with the gear 124. Interposed between the gears 127 and 128 is a gear ring 130 having on its periphery a gear segment 131 which meshes with a segmental gear 132 keyed to a rock shaft 133. The shaft 133 is rocked by an arm 134 carrying a cam roll 135 running on a stationary cam 136. The ring 130 carries bevel pinions 137 which run in mesh with gear teeth formed in the upper face of the gear 127, and gear teeth on the lower face of the gear 128. The gear 128 is provided on its periphery with gear teeth 138 which drive an idler pinion 139. The pinion 139 also meshes with a gear 140 loosely mounted on the shaft section 121 for rotation thereon. A gear 141 is keyed to the neck mold shaft section 121 and is driven by a gear segment 142 on a rock shaft 143 (Fig. 6) carrying a rock arm 144 connected through a link 145 with a lever 146 fulcrumed at 147 and carrying a cam roll 148 running in a stationary cam 149 on a cam plate 150 (Fig. 2).

The gear 140 (see Figs. 7 and 3) runs in mesh with a gear 151 on a short vertical shaft supported on the mold bottom frame 119. Said shaft carries a pinion 152 which drives a pinion 153 on the lower end of a shaft 154, to the upper end of which is secured a bevel pinion 155 which drives a bevel gear 156 on a horizontal stud shaft which carries a gear 157 engaging rack teeth formed on the tubular stem 158 of the bottom plate 118. It will be seen that when the gear 140 is rotated in either direction, the motion will be transmitted through the train of gears just described and impart a vertical movement to the mold bottom plate in a corresponding direction. The gear 125 (Fig. 7) is actuated by a cam 159 (Fig. 2) operating through a lever 160 having an operating connection 161 with the gear segment, these parts being substantially identical with or similar to the mechanism shown in Fig. 6 for operating the gear segment 142.

By means of the gear mechanism just described and shown particularly in Figs. 6 and 7, the following movements of the mold bottom arm 119, neck mold arm 55 and mold bottom plate 118 are effected:

First,—The mold bottom arm 119 is swung outward to carry the bottom plate 118 from its inner position through an arc 162 (Fig. 1) to a position directly beneath the neck mold. This movement is controlled by the cam 159 (Fig. 2) which operates the gear segment 125 (Fig. 7) as above described, thereby driving the gear 124 and integral sleeve 122 to which the mold bottom arm 119 is connected. Said arm is, therefore, rotated about the neck mold shaft 121 which at this time remains stationary, so that the bottom plate 118 swings through the arc 162 and is thereby positioned beneath the neck mold. An adjustable stop 163 (Figs. 3 and 7) which may be in the form of a screw adjustable in a bracket 164 formed on the gear 141, arrests the arm 119 as the bottom plate is brought into register with the neck mold. During the rotation of the arm 119, the gear 124 drives the differential gear 127 which in turn drives the pinions 137, thereby rotating the gear 128 in the opposite direction from that of the gear 127. This movement is transmitted through the idler gear 139 to the ring gear 140 so that the latter is rotated in the same direction and at the same speed as the gear 124. Thus, the gear 140 is rotated at the same angular speed as the arm 119 which carries the train of gears 152 to 157 for raising and lowering the bottom plate, so that no motion is transmitted through said gears. In other words, the rotation of the gear 140 at the same time and at the same speed as the gear 124 prevents any up or down movement being imparted to the bottom plate 118, as would occur if the gear 140 were held stationary or moved at a different angular speed from that of the arm 119.

Second,—Swinging movement of the neck mold arm and mold bottom arm as a unit while the parison is being transferred from the blank mold to the finishing mold, is effected by the cam 149 operating through the lever 146 (Fig. 6) and gear segment 142 to drive the pinion 141 which is keyed to the neck mold shaft section 121. The neck mold shaft is thus rotated and swings the neck mold arm inward. As the mold bottom frame 119 is in contact with the stop 163 the latter serves to swing the frame 119 with the neck mold arm. During this return movement the gear 140 will again be rotated by means of the gear train including the differential gears, in the same direction and at the same speed as the gear 124, so that no up or down movement is imparted to the mold bottom due to the swinging movement of the frame 119.

Third,—After the parison has been enclosed in the finishing mold, the neck mold is released from the parison and the neck mold arm 55 swings outwardly while the bottom plate remains beneath the finishing mold. This outward movement of the neck mold arm is effected by the cam 149 which operates to rotate the gear 141 and shaft 121 in the opposite direction to that described in the next preceding paragraph. During this movement the frame 119 and the differential gear mechanism remain stationary.

Fourth,—The mold bottom plate 118 while beneath the neck mold is given certain up and down movements which take place in part while the parison is stationary (relative to the mold carriage), and in part while the neck mold frame 55 and the frame 119 are rotating about the axis of the shaft 117 to transfer the parison from the blank mold to the finishing mold. These up and down movements are controlled by the cam 136 (Fig. 7) which operates the shaft 133 and gear 132 as heretofore described to rotate the gear ring 130. If the frame 119 is stationary at this time so that the gear 127 is held stationary, the rotation of the gear ring 130 will cause rotation of the pinions 137 on their axes, thereby rotating the gear 128. This movement is transmitted through the idler gear 139 to the gear 140 which, therefore, operates through the gear train 151 to 157 for raising or lowering the bottom plate. Up or down movement can also be imparted to the bottom plate by means of the gearing just described, while the frame 119 is rotating about its axis, because the rotation of the gear ring 130 under the influence of the cam 136, will either increase or decrease the rate of movement of the gear 128, thereby causing the gear 140 to rotate relatively to the gear 124 and frame 119 and thereby impart up or down movement to the mold bottom.

*Operation*

A résumé of the operation will now be given by pointing out the successive steps in the complete cycle of operations of a single mold group. As the mold carriage is rotated continuously by the motor 23 (Fig. 2) each mold group is carried in succession past the several stations or positions A, B, C, D, E and F (Fig. 1). At station A, the blank mold 40 is in dip and the neck mold 41 closed and in register with the blank mold. The vacuum controlling valve 108 (Fig. 3) is held open at this time by its cam 111 (Fig. 2) so that suction is applied to draw a gather of glass into the blank mold and neck mold. The neck mold plunger 88 at this time is held in its lowered position by its cam 89. While the blank mold is gathering its charge the finishing mold 42 of the same group is in closed position with a blown bottle 170 therein, the mold bottom plate 118 being beneath and in register with the finishing mold.

As the molds advance beyond the gathering position, the cam 71 (Figs. 2 and 5) operates through the bell crank 75 to lift the dip head frame 68, thereby lifting the neck mold and blank mold to permit the latter to clear the edge of the gathering pot 69 (see Fig. 10). The knife 78 is now operated by its cam 81 to sever the glass. After the blank mold passes beyond the rim of the gathering pot it is again lowered.

During the travel of the molds from station A to station B, the blank mold 40 is opened by its cam 45 (see Fig. 5). The finishing mold 42 is also opened by its cam 63, leaving the finished bottle 170 supported on the bottom plate 118.

As the mold group travels from station B to station C, the mold bottom arm 119 is swung outward to carry the bottom plate to a position directly beneath the neck mold. This swinging movement of the arm 119 is effected by the cam 159 (Fig. 2) operating as heretofore described. During this outward swinging movement of the bottom plate, a take-off mechanism (not shown) operates to remove the finished bottle 170 from the machine, leaving the bottom plate free to be brought beneath the bare parison which is depending from the neck mold.

After the bottom plate has been brought beneath the bare parison 171 it is moved vertically upward as indicated in broken lines (Fig. 11) to engage the lower end of the parison and compress it to a certain extent, thereby spreading the lower end portion of the parison. The vertical movements of the bottom plate are controlled by the cam 136 (Fig. 7) operating through the differential gear mechanism, as heretofore explained. After the bottom plate is brought beneath the neck mold, the neck mold arm 55 and bottom arm 119 swing inward as a unit toward the center of the machine, the swinging movements of the neck mold arm 55 being under the control of the cam 149 (Fig. 6). It will be noted that this inward movement of the neck mold and bottom plate is taking place by the time the mold group reaches station C. Before, during and after this transfer of the bare blank from the open blank mold to the finishing mold, the blank is developed to a certain extent. This development is effected in part by supplying air under pressure through the neck mold before transfer to partially expand the parison as indicated at 172 (Fig. 12) and in part by up and down movements of the bottom plate 118. Thus, as shown in Fig. 12, the bottom plate has been lowered from the broken line position of Fig. 11, permitting the plastic parison to elongate downwardly under the action of gravity combined with the action of the air under pressure supplied through the neck mold.

During the travel of the mold group from station C to station D, the inward swinging movement of the neck mold, mold bottom and bare parison is completed and the finishing mold closed around the parison. When the parison is thus enclosed, the blowing head 114 (Figs. 2, 3 and 14) is moved downward to seat on the neck mold and air under pressure is supplied to blow the parison to its finished form 170 (Fig. 14). After the bottle is thus blown the blowing head is lifted. The neck mold sections are then separated, as shown at station E, by the operation of the spring 61 within the air motor 57. The dip head is now lifted, thereby lifting the neck mold arm (Fig. 15) to clear the neck of the bottle, and said arm during its travel from station E to station F is again swung outwardly to a position over the open blank mold 40. After the neck mold is swung laterally away from the finishing mold, the blowing head 114 is again moved downward, this time seating directly on the finishing mold (see Fig. 16) and air pressure is again supplied so that the bottle is fully expanded and held expanded within the finishing mold until it has cooled and hardened sufficiently to retain its shape without the support of the mold. It will be noted that while the neck mold swings outward, the bottom plate remains in its inner position beneath the finishing mold, which position is retained until the mold group has again passed the gathering station.

During the travel of the molds from station F to station A, the blank mold and neck mold both close preparatory to receiving another charge of glass. These molds are also given an up and down movement to carry them over the rim of the gathering pot, the path of movement being indicated by a broken line 173 (Fig. 8).

Modifications may be resorted to within the spirit and scope of our invention.

What we claim is:

1. The combination of a mold carriage rotatable about a vertical axis, a neck mold arm mounted to swing about a vertical axis on the mold carriage, a neck mold comprising separable sections mounted on said arm, a blank mold, means to swing the neck mold arm about its axis for moving the neck mold into and out of register with the blank mold, and means for opening and closing the neck mold comprising an air motor supported on the neck mold arm.

2. The combination of a mold carriage rotatable about a vertical axis, a neck mold arm mounted to swing about a vertical axis on the mold carriage, a neck mold comprising separable sections mounted on said arm, a blank mold, and means to swing the neck mold arm about its axis for moving the neck mold into and out of register with the blank mold, the neck mold sections being movable bodily in a direction lengthwise of said arm for opening and closing the neck mold.

3. In a machine for forming glass articles, the combination of a horizontally rotating mold carriage, a mold arm supported on the carriage and mounted to swing about a vertical axis on the carriage, guides on said arm, mold sections movable on said guides for opening and closing the mold, a piston motor mounted on said arm, and operating connections between the motor and the mold sections.

4. In a machine for forming glass articles, the combination of a horizontally rotating mold carriage, a mold arm supported on the carriage and mounted to swing about a vertical axis on the carriage, guides on said arm, mold sections movable on said guides for opening and closing the mold, a piston motor mounted on said arm and comprising a piston connected to one of the mold sections, and a rack and pinion connection between the piston and the other mold section.

5. The combination of a mold carriage rotatable about a vertical axis, a blank mold supported thereon and comprising separable sections having their meeting faces arranged in a plane substantially perpendicular to a radius extending from the axis of the mold carriage to the center of the blank mold, a finishing mold mounted on the mold carriage and comprising separable sections having their meeting faces in a plane substantially radial to the mold carriage, the finishing mold being nearer than the blank mold to the axis of the mold carriage, and means for swinging a parison laterally from the blank mold to the finishing mold in an arc substantially tangent to said planes.

6. The combination of a mold carriage rotatable about a vertical axis, a blank mold mounted thereon and comprising separable sections having their meeting faces arranged in a plane substantially perpendicular to a radius extending from the axis of the mold carriage to the center of the blank mold, a finishing mold mounted on the mold carriage and comprising separable sections having their meeting faces in a plane substantially radial to the mold carriage, the finishing mold being nearer than the blank mold to the axis of the mold carriage, a neck mold arm, a neck mold thereon, said arm being mounted on the mold carriage, and means to swing said arm about a vertical axis located between the blank mold and finishing mold and thereby transfer a parison from the blank mold to the finishing mold, said arm being arranged to move the parison during said transfer, through an arc substantially tangent to said planes.

7. In a machine for forming glass articles, the combination of a mold carriage, means for rotating it continuously about a vertical axis, a blank mold and a finishing mold mounted on the carriage to rotate therewith, the blank mold being at a position in advance of the finishing mold, and means for transferring a parison from the blank mold to the finishing mold, the molds and transfer means being so arranged that the direction of movement of the parison relative to the mold carriage as it moves away from the blank mold is substantially opposite to the direction in which the blank mold is at the same time moving with the mold carriage.

8. In a machine for forming glass articles, the combination of a mold carriage, means for rotating it continuously about a vertical axis, a blank mold and a finishing mold mounted on the carriage to rotate therewith, the blank mold being at a position in advance of the finishing mold, a transfer arm pivoted to swing horizontally on the mold carriage, said arm having its pivot between the axis of the mold carriage and the blank mold center and substantially in line with said axis and mold center, and means on said arm for engaging a parison and carrying it from the blank mold to the finishing mold, the swinging movement of said arm being in a direction such that the movement of the parison therewith relative to the mold carriage as the parison leaves the blank mold, is in a direction opposite to the direction in which the blank mold is then moving with the mold carriage.

9. The combination of a mold carriage rotatable about a vertical axis, a blank mold supported on the mold carriage, a neck mold arm pivoted on the mold carriage, the axis of said arm being between and in line with the blank mold and the axis of the mold carriage, a neck mold carried by said arm, a finishing mold, and means for swinging said arm about its axis while the mold carriage is rotating, thereby swinging the neck mold and a suspended parison from the blank mold to the finishing mold, the direction of movement of the neck mold and parison relative to the mold carriage as the parison leaves the blank mold, being substantially opposite to the direction of movement of the blank mold with the mold carriage.

10. The combination of a mold carriage, a blank mold, a neck mold open at its lower end to receive a charge of glass above and in register with the blank mold, a finishing mold, a mold bottom, means for introducing a charge of glass into the blank mold and neck mold through the lower open end of the blank mold and forming a parison, means for opening the blank mold, leaving the parison suspended from the neck mold, means for moving the mold bottom to a position beneath the parison to form a bottom support therefor, and means for moving the neck mold and said bottom with the parison supported thereby, and thereby transferring the parison to the finishing mold.

11. The combination of a mold carriage, a blank mold, a neck mold above and in register with the blank mold, a finishing mold, a mold bottom, means for introducing a charge of glass into the blank mold and neck mold and forming a parison, means for opening the blank mold, leaving the parison supported in the neck mold, means for moving the mold bottom to a position beneath the parison after the blank mold opens, to form a bottom support for the parison, means for moving the neck mold and said bottom with the parison supported thereby, and thereby transferring the parison to the finishing mold, and means for partially developing the parison in the open.

12. In a machine for forming hollow glass articles, the combination of a blank mold, a finishing mold, means for opening and closing said molds separately, means for introducing a charge of glass into the blank mold and forming a parison therein, and transfer mechanism including means for engaging and supporting the upper and lower ends of the parison and for moving it laterally from the blank mold to the finishing mold while thus supported.

13. In a machine for forming hollow glass articles, the combination of a blank mold, a finishing mold, means for opening and closing said molds separately, means for introducing a charge of glass into the blank mold and forming a parison therein, transfer mechanism including means for engaging and supporting the upper and lower ends of the parison and for moving it laterally from the blank mold to the finishing mold while thus supported, and means for applying air under pressure to the interior of the parison while in the open, and thereby developing the parison in the open.

14. In a machine for forming hollow glass articles, the combination of a blank mold, a neck mold above and in register with the blank mold, a finishing mold located laterally of and at about the same level as the blank mold, means for introducing a charge of glass into the combined blank and neck mold and forming a parison therein, means for opening the blank mold and leaving the bare parison suspended from the neck mold, a mold bottom plate, means for moving the bottom plate into a position beneath the parison and for then moving the bottom plate upwardly into engagement with the lower end of the parison, and means for moving the neck mold and bottom plate laterally as a unit and thereby carrying the parison to the finishing mold.

15. In a machine for forming hollow glass articles, the combination of a blank mold, a neck mold above and in register with the blank mold, a finishing mold located laterally of and at about the same level as the blank mold, means for introducing a charge of glass into the combined blank and neck mold and forming a parison therein, means for opening the blank mold and leaving the bare parison suspended from the neck mold, a mold bottom plate, means for moving the bottom plate into a position beneath the parison and for then moving the bottom plate upwardly into engagement with the lower end of the parison, means for moving the neck mold and bottom plate laterally as a unit and thereby carrying the parison to the finishing mold, means for closing the finishing mold around the parison while the latter is supported by said neck mold and bottom plate, and means for blowing the parison in the finishing mold.

16. In a machine for forming hollow glass articles, the combination of a blank mold, a neck mold above and in register with the blank mold, a finishing mold located laterally of and at about the same level as the blank mold, means for introducing a charge of glass into the combined blank and neck mold and forming a parison therein, means for opening the blank mold and leaving the bare parison suspended from the neck mold, a mold bottom plate, means for moving the bottom plate into a position beneath the parison and for then moving the bottom plate upwardly into engagement with the lower end of the parison, means for moving the neck mold and bottom plate laterally as a unit and thereby carrying the parison to the finishing mold, means for closing the finishing mold around the parison while the latter is supported by said neck mold and bottom plate, a blowing head movable into engagement with the neck mold for blowing the parison to its final shape in the finishing mold, and means for then withdrawing the neck mold and moving the blowing head into engagement with the finishing mold for a final blowing operation.

17. In a machine for forming hollow glass articles, the combination of a mold, means for introducing a charge of molten glass and shaping it in the mold to form a parison, an upper support located above the mold and engaging the parison while the latter is in the mold, a lower support, means for moving the lower support to a parison supporting position beneath the mold and the parison of glass while the parison is still in the mold, and means for moving said supports laterally away from the mold and thereby carrying the parison away from the mold.

18. The combination of a blank mold, a finishing mold, means for introducing a charge of glass into the blank mold and forming a parison therein, supports for the parison above and below the blank mold, said supports adapted to engage the ends of the parison, means for moving said supports laterally and thereby carrying the parison horizontally into the finishing mold, and means for causing a relative movement of the supports in a direction lengthwise of the parison while the latter is carried by said supports.

19. In a machine for forming glass articles, the combination of a blank mold, a finishing mold located laterally thereof, means for opening and closing the molds, top and bottom supports engaging a parison formed in the blank mold, means for transferring the parison from the blank mold to the finishing mold by a relative movement of said supports and molds, and means for developing the parison by a relative movement of the supports in a direction lengthwise of the parison.

20. In a glass forming machine, the combination of a mold carriage, a blank mold and a finishing mold supported on the carriage, a neck mold arm, a neck mold thereon, a mold bottom arm, a mold bottom plate thereon, said arms mounted to swing about a common axis, and means for swinging said arms as a unit in one direction and for swinging them separately in the reverse direction.

21. In a machine for forming hollow glass articles, the combination of a neck mold frame, a neck mold thereon, a mold bottom frame, a mold bottom plate thereon, said frames mounted to swing about the same vertical axis, means for oscillating the neck mold frame about said axis, and means for swinging the mold bottom frame in one direction about said axis and thereby bringing the bottom plate beneath and in vertical alignment with the neck mold, said neck mold frame having a stop surface to arrest the mold bottom frame in said position of alignment, and maintaining said parts in alignment during the movement of the frames in the reverse direction.

22. In a machine for forming hollow glass articles, the combination of a neck mold frame, a shaft to which said frame is connected, a mold bottom frame, a shaft to which said bottom frame is connected, said shafts being mounted to oscillate about the same vertical axis, gears connected to said shafts respectively, cams individual to said gears, and driving connections between the cams and the respective gears, said cams operative to rock said frames respectively about said axis independently of each other.

23. In a machine for forming hollow glass articles, the combination of a neck mold frame, a shaft to which said frame is connected, a mold bottom frame, a shaft to which said bottom frame is connected, said shafts being mounted to oscillate about the same vertical axis, gears connected to said shafts respectively, cams individual to said gears, driving connections between the cams and the respective gears, said cams operative to rock said frames respectively about said axis independently of each other, and means by which one of said frames swings the other frame in one direction.

24. In a machine for forming hollow glass articles, the combination of a mold bottom frame, a bottom plate mounted thereon, a vertical shaft to which said frame is secured, a gear fixed to said shaft, means for driving said gear and thereby swinging said frame about said axis, a gear pinion mounted to rotate about said axis independently of said frame, driving connections between said pinion and the bottom plate for lifting or lowering said plate when said pinion is rotated relative to said frame, means for transmitting motion from said first mentioned gear to said pinion when said frame is moved about its axis and thereby causing said pinion to rotate with the frame, and means for rotating said pinion relative to said frame.

25. In a machine for forming hollow glass articles, the combination of a vertical rock shaft, a mold bottom frame connected thereto, a mold bottom plate on said frame, a driving gear on said shaft, a pinion mounted to rotate separately from said shaft, operating connections between said pinion and the bottom plate for lifting or lowering the latter as said pinion rotates relative to the frame, a train of gears extending from said drive gear to said pinion and operative to rotate said pinion with said shaft, a cam, and means actuated by said cam to transmit motion through a portion of said gear train to said pinion for rotating the latter and thereby lifting or lowering the bottom plate.

26. In a machine for forming glass articles, the combination of a suction gathering mold open at its lower end to receive a charge of glass, said mold comprising separable sections hinged to swing about a common axis for opening and closing the mold, and a knife mounted to swing about said axis for severing the glass.

27. In a glass forming machine, the combination of a mold comprising separable sections, a hollow hinge pin, said sections mounted to swing about the axis of said hinge pin for opening and closing the mold, a knife shaft extending through said hinge pin, a knife carried thereby, and means to rock said shaft and swing the knife across the end of the mold.

28. In a glass forming machine, the combination of a mold comprising horizontally separable sections, arms carrying said sections, a hollow pivot pin on which said arms are mounted, a vertical rock shaft extending through said pivot pin, a knife on the lower end of said shaft, means for introducing glass by suction into the mold, and means for rocking said shaft and thereby causing the knife to sever the glass.

29. A machine for forming glass articles comprising, in combination, a mold carriage rotatable about a vertical axis, an annular series of mold groups thereon, each comprising a blank mold, a neck mold and a finishing mold, each blank mold being horizontally spaced from the finishing mold of the same group, neck mold arms carrying the neck molds, each said arm being pivoted to swing about a vertical pivot between the blank mold and finishing mold of the corresponding group with the pivot of said arm substantially in the radial line extending from the axis of the mold carriage to the said blank mold, and means for swinging said arm about the said vertical pivot and thereby carrying the neck mold from a position in register with the blank mold to a position in register with the finishing mold, said arm extending substantially radially of the mold carriage when the neck mold registers with the blank mold.

30. In a machine for forming glass articles, the combination of a mold table rotatable about a vertical axis, a mold group thereon comprising a blank mold, a neck mold and a finishing mold, the finishing mold being spaced laterally from the blank mold and nearer than the blank mold to the axis of the mold carriage, the blank mold comprising separable halves with their meeting faces in a vertical plane substantially tangent to the path of travel of the mold center about said axis, an arm pivoted between and in line with the blank mold and said axis, the neck mold being carried on said arm, and means for swinging said arm about its pivot and thereby swinging the neck mold from a position in register with the blank mold to a position in register with the finishing mold.

Signed at Toledo, in the county of Lucas and State of Ohio, this 22nd day of December, 1928.

AUGUST KADOW.
RUSSELL G. ALLEN.